(No Model.)
K. R. KILBOURN.
METHOD OF GENERATING HEAT.
No. 361,164. Patented Apr. 12, 1887.
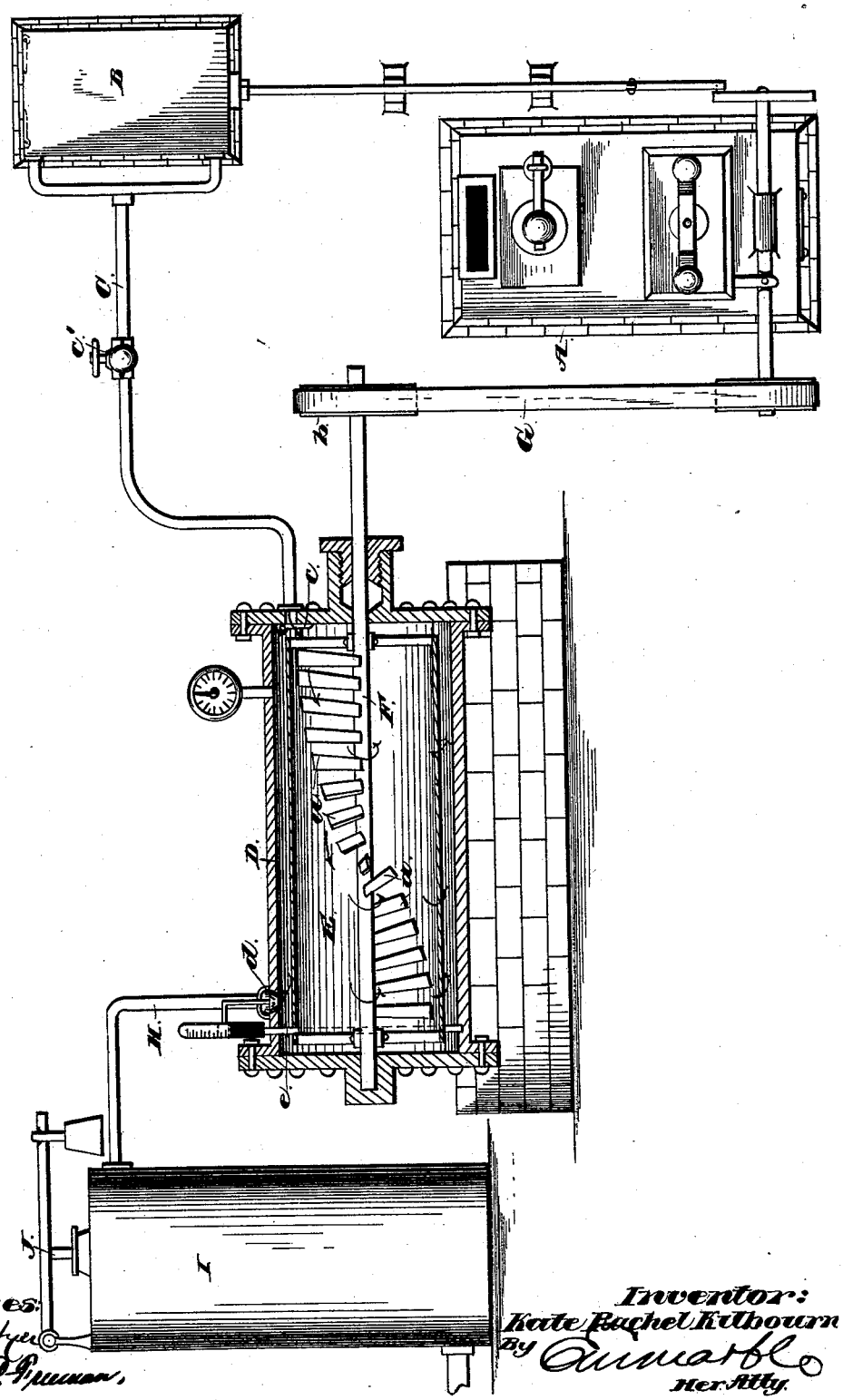
Witnesses:
Chas. B. Hyer
James P. ?
Inventor:
Kate Rachel Kilbourn
By ?
Her Atty.

UNITED STATES PATENT OFFICE.

KATE RACHEL KILBOURN, OF WASHINGTON, DISTRICT OF COLUMBIA.

METHOD OF GENERATING HEAT.

SPECIFICATION forming part of Letters Patent No. 361,164, dated April 12, 1887.

Application filed August 13, 1885. Renewed March 15, 1887. Serial No. 231,041. (No model.)

*To all whom it may concern:*

Be it known that I, KATE RACHEL KILBOURN, a citizen of the United States, residing at Washington, in the District of Columbia, have invented certain new and useful Improvements in Methods of Generating Heat, of which the following is a specification, reference being had therein to the accompanying drawing.

My invention relates to a method of generating heat from atmospheric air; and it consists in the several steps which will be more fully hereinafter described, and pointed out in the claims.

The essential feature of my method consists in forcing air into a cylinder or receptacle, there retaining it under pressure, and subjecting it to the action of rapidly-moving frictional appliances, by which it shall become heated to any required degree, then conveying it to suitable storage tanks or reservoirs, and from thence to the place or places where it is to be used.

The object of my invention is to provide heat, through the medium of the air, for heating buildings and for mechanical and other purposes.

In the accompanying drawing, forming a part of this specification, I have illustrated one of the many ways of carrying this principle into effect, wherein like letters of reference indicate similar parts, and in which a diagrammatic view of a plant partly in plan and partly in sectional elevation is shown.

A indicates any suitable and well-known form of engine, and B an air-compressor. Connected with the air-compressor B by a suitable conduit, C, is an air-tight cylinder, D, within which is situated an open-ended cylinder, E, of somewhat less diameter and length than the cylinder D, and so mounted therein as to leave a narrow annular space between the cylinders and passages at their ends.

F indicates a shaft so boxed or journaled in the cylinder-heads that no air can escape through the same. The portion of shaft F lying within the cylinders is provided with spirally-arranged beaters or blades *a*, and the portion extending beyond one of the cylinder-heads has fast thereon a pulley, *b*, to which power from the engine A is applied by means of the belt G.

The compressor B is provided with suitable inlet and outlet passages and valves, and where the conduit C connects with the cylinder D is placed an inwardly-opening valve, *c*, and in said conduit C is also situated a check-valve, *c'*, for regulating the flow of air to the cylinder D from the said compressor B.

*d* indicates a valve which controls the outlet from the cylinder D, and is actuated by the expansion and contraction of a rod, *e*, to which it is attached, and which is securely fastened to the cylinder D. This valve *d* opens into a conduit, H, leading to a storage-tank, I, which is provided with suitable inlet and outlet valves and a safety-valve, J. From the tank I the heated air may be taken to different points, to be used for any of the various purposes to which heated air is applicable.

The operation and several steps of my method are as follows: Air is forced into the cylinder D by the compressor B until a predetermined pressure is established, when its further introduction to cylinder D is stopped by the cut-off valve *c'* in the conduit C. By means of the belt G the shaft F is caused to revolve rapidly, giving the air a rapid gyrating movement within the cylinder E, and at the same time producing a strong current in the direction indicated by the arrows. When the air has attained a sufficiently-high temperature by friction in this cylinder, the thermostatic valve *d* is opened and air allowed to escape through the conduit H to the storage-tank I. At this period of the operation the compressor B is again put into motion, and the action of the apparatus becomes continuous. The heated air under pressure can be taken directly from the frictional heating-cylinder and conveyed to the place or places to which it is to be applied for any suitable purpose, thus dispensing with all storage vessels and reservoirs.

It is obvious that any form of cylinder, valves, compressor, as well as motive power, could be substituted for those shown and described without in the least departing from the nature and principle of my invention.

Having thus described my invention, what I claim as new, and desire to secure by Letters Patent, is—

1. The herein-described method of generating heat, which consists in forcing air into a receptacle, there retaining it under pressure and subjecting it to frictional mechanical appliances until the required degree of heat is attained, substantially as described.

2. The herein-described method of generating heat, which consists in forcing air into a suitable receptacle and there retaining it under pressure and subjecting it to frictional mechanical appliances until a required degree of heat is attained, and then conveying the same to a reservoir or receiver, from which it may be distributed as may be necessary, substantially as described.

In testimony whereof I affix my signature in presence of two witnesses.

KATE RACHEL KILBOURN.

Witnesses:
CHARLES S. HYER,
EMMA M. GILLETT.